(12) United States Patent
Kawakami et al.

(10) Patent No.: US 6,352,207 B1
(45) Date of Patent: Mar. 5, 2002

(54) EXPANSION VALVE

(75) Inventors: Satoshi Kawakami; Isao Sendo; Tatsuo Ito; Shigeyoshi Ueno, all of Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/667,378

(22) Filed: Sep. 22, 2000

(30) Foreign Application Priority Data

Oct. 15, 1999 (JP) ............................ 11-294355

(51) Int. Cl.[7] .............................................. F25B 41/04
(52) U.S. Cl. ....................................... 236/92 B; 62/225
(58) Field of Search ......................... 62/225; 236/92 B, 236/99 R

(56) References Cited

U.S. PATENT DOCUMENTS 5,924,629 A * 7/1999 Kobayashi et al. ....... 236/92 B
5,961,038 A * 10/1999 Okada ...................... 236/92 B
6,062,484 A * 5/2000 Eybergen .................. 236/92 B

FOREIGN PATENT DOCUMENTS

EP 0 831 283 3/1998
EP 0 846 927 6/1998

* cited by examiner

*Primary Examiner*—William E. Tapolcai
(74) *Attorney, Agent, or Firm*—Nilles & Nilles SC

(57) ABSTRACT

In an expansion valve having a control mechanism with an airtight chamber, the airtight chamber is sealed by a steel ball joined into a filling hole in a metallic wall of the airtight chamber. The steel ball is fixed by resistance welding for sealing the filling hole. The diameter ratio between the inner diameter of the filling hole and the outer diameter of the spherical surface of the steel ball is set to a value falling in a range from 0.6 to 0.85.

7 Claims, 6 Drawing Sheets

Fig.2
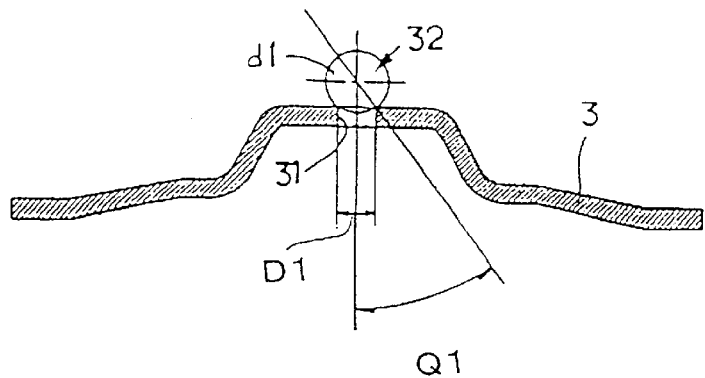
Fig.3
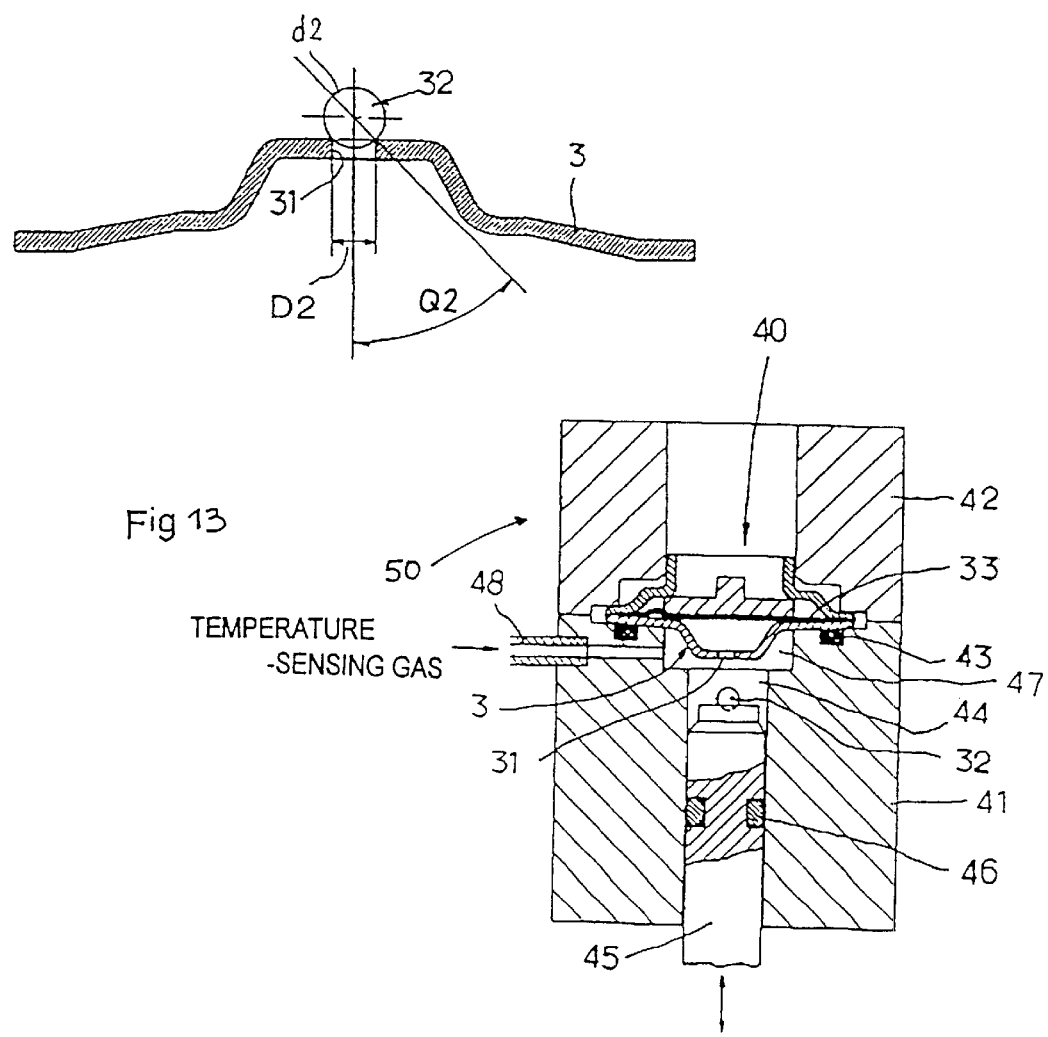
Fig 13
TEMPERATURE-SENSING GAS

| Orifice/Ball | 2.5 | 3.175 | 3.5 | 3.97 | 4.5 |
|---|---|---|---|---|---|
| 1 | 0.40 | 0.31 | 0.29 | 0.25 | 0.22 |
| 1.1 | 0.44 | 0.35 | 0.31 | 0.28 | 0.24 |
| 1.2 | 0.48 | 0.38 | 0.34 | 0.30 | 0.27 |
| 1.3 | 0.52 | 0.41 | 0.37 | 0.33 | 0.29 |
| 1.4 | 0.56 | 0.44 | 0.40 | 0.35 | 0.31 |
| 1.5 | 0.60 | 0.47 | 0.43 | 0.38 | 0.33 |
| 1.6 | 0.64 | 0.50 | 0.46 | 0.40 | 0.36 |
| 1.7 | 0.68 | 0.54 | 0.49 | 0.43 | 0.38 |
| 1.8 | 0.72 | 0.57 | 0.51 | 0.45 | 0.40 |
| 1.9 | 0.76 | 0.60 | 0.54 | 0.48 | 0.42 |
| 2 | 0.80 | 0.63 | 0.57 | 0.50 | 0.44 |
| 2.1 | 0.84 | 0.66 | 0.60 | 0.53 | 0.47 |
| 2.2 | 0.88 | 0.69 | 0.63 | 0.55 | 0.49 |
| 2.3 | 0.92 | 0.72 | 0.66 | 0.58 | 0.51 |
| 2.4 | 0.96 | 0.76 | 0.69 | 0.60 | 0.53 |
| 2.5 | 1.00 | 0.79 | 0.71 | 0.63 | 0.56 |
| 2.6 | 1.04 | 0.82 | 0.74 | 0.65 | 0.58 |
| 2.7 | 1.08 | 0.85 | 0.77 | 0.68 | 0.60 |
| 2.8 | 1.12 | 0.88 | 0.80 | 0.71 | 0.62 |
| 2.9 | 1.16 | 0.91 | 0.83 | 0.73 | 0.64 |
| 3 | 1.20 | 0.94 | 0.86 | 0.76 | 0.67 |
| 3.1 | 1.24 | 0.98 | 0.89 | 0.78 | 0.69 |
| 3.2 | 1.28 | 1.01 | 0.91 | 0.81 | 0.71 |
| 3.3 | 1.32 | 1.04 | 0.94 | 0.83 | 0.73 |
| 3.4 | 1.36 | 1.07 | 0.97 | 0.86 | 0.76 |
| 3.5 | 1.40 | 1.10 | 1.00 | 0.88 | 0.78 |
| 3.6 | 1.44 | 1.13 | 1.03 | 0.91 | 0.80 |
| 3.7 | 1.48 | 1.17 | 1.06 | 0.93 | 0.82 |
| 3.8 | 1.52 | 1.20 | 1.09 | 0.96 | 0.84 |
| 3.9 | 1.56 | 1.23 | 1.11 | 0.98 | 0.87 |
| 4 | 1.60 | 1.26 | 1.14 | 1.01 | 0.89 |
| 4.1 | 1.64 | 1.29 | 1.17 | 1.03 | 0.91 |
| 4.2 | 1.68 | 1.32 | 1.20 | 1.06 | 0.93 |
| 4.3 | 1.72 | 1.35 | 1.23 | 1.08 | 0.96 |
| 4.4 | 1.76 | 1.39 | 1.26 | 1.11 | 0.98 |
| 4.5 | 1.80 | 1.42 | 1.29 | 1.13 | 1.00 |
| 4.6 | 1.84 | 1.45 | 1.31 | 1.16 | 1.02 |

EXPANSION VALVE

BACKGROUND OF THE INVENTION

1. Field of the Invention

The invention relates to an expansion valve as e.g. Used in a refrigeration system of an automobile, including a valve body having a high-pressure refrigerant passage for supplying a high-pressure refrigerant to an evaporator of a refrigeration system, and a low-pressure refrigerant passage for a low-pressure refrigerant discharged from said evaporator, a valve mechanism for regulating a flow rate of the high-pressure refrigerant in the high-pressure refrigerant passage, and a control mechanism having an airtight chamber filled with a temperature-sensing gas, a circular filling hole for filling the temperature.-sensing gas into the airtight chamber, and a steel ball fixed by spot welding in said filling hole for sealing the filled airtight chamber, the control mechanism controlling the valve mechanism in accordance with a change in pressure in the airtight chamber caused by a change in volume of the temperature-sensing gas which is induced by a change in temperature of the low-pressure refrigerant flowing through said low-pressure refrigerant passage, and a control mechanism for such expansion valves.

In a refrigeration system (refrigerating cycle) low-pressure gaseous refrigerant (low-pressure refrigerant) delivered from an evaporator to a compressor is adiabatically compressed by the compressor. The resulting high-temperature, high-pressure gaseous refrigerant is condensed by a condenser by heat exchange to obtain a liquid refrigerant (high-pressure refrigerant). Said refrigerant is adiabatically expanded by means of a restrictor in the expansion valve to obtain a low-temperature, low-pressure atomized refrigerant. Within the evaporator the atomized refrigerant is evaporated by heat exchange with ambient air such that the atomized refrigerant again becomes low-pressure gaseous refrigerant. The quantity of refrigerant supplied to the evaporator is adjusted in accordance with a load condition of the evaporator and by using the temperature of the low-presort refrigerant discharged from the evaporator as a parameter. Said adjustment usually is performed by the expansion valve which may have a design as described above.

The control mechanism of said expansion valve comprises an airtight chamber bounded by a diaphragm and a surrounding metallic rigid wall. A temperature-sensing gas is contained in the airtight chamber. The temperature-sensing gas changes its volume in accordance with the temperature of the low-pressure refrigerant contacting e.g. said diaphragm such that the internal pressure within the airtight chamber also changes. By displacement of said diaphragm said valve mechanism is controlled such that the valve opening degree is varied for flow adjustment.

2. Description of the Related Art

EP 0 846 927 A discloses a method for filing the airtight chamber of a control mechanism of an expansion valve. First a filling hole is cut into a part of the metallic wall of the airtight chamber. Then the temperature-sensing gas is filled through the filling hole. Finally, the filling hole is sealed by a steel pellet having the shape of a steel ball spot-welded into the filling hole, e.g. by electric resistance welding along the contact region between the steel ball and the peripheral upper edge of the filling hole. The steel ball regular spherical surface avoids significant variations of the contact with the filling hole edge such that there is less liability of a poor weld. Nevertheless, stable welding conditions cannot be guaranteed so that frequently a secondary sealing by soldering, has to be provided.

EP 831 283 A discloses an expansion valve, the airtight chamber of its control mechanism being sealed by a metallic plug of tapered shape. The plug is spot-welded to the exterior vicinity of the filling hole to seal the filling hole after filling the airtight chamber with gas. As the filling hole sealed with the tapered plug by resistance welding, and the plug has an inclined position in alignment the angle between the outer surface of the plug and the inner surface of the filing hole varies, possibly causing a poor weld quality as a result of said irregular contact. A poor weld with a gap located inside of the weld (nugget) allows the temperature-sensing gas to seep through or induces crevice corrosion. Therefore, secondary sealing between the plug and the fill hole is performed e.g. by soldering.

OBJECTS AND SUMMARY OF THE INVENTION

It is an object of the invention to provide an expansion valve and a control mechanism of the kind a disclosed using a steel ball for sealing the filling hole allowing the achievement of high sealing reliability by e.g. resistance welding. If the ratio D/d between the inner diameter D of the filling hole and the outer diameter d of the spherical surface of the steel ball is set to 0.6 to 0.85, a weld or nugget uniformly can be formed by electric welding over the entire circumference around the contact portion between the steel ball and the filling hole. This improves the reliability of sealing the filling hole. Furthermore, since no small gap can be formed at the contact region between the steel ball and the filling hole edge crevice corrosion can be reliably prevented.

The same positive result is achieved if the steel ball is spot-welded to the filling hole upper edge such that the angle between a line passing through the center of the steel ball and the center of the filling hole and a straight line passing through the center of the steel ball and a point at which the spherical surface of the steel ball touches the upper edge of the filling hole is set between 37° and 58°.

Furthermore, it is of advantage for the quality of the sealing formed by the spot welding if the steel ball spot-welded into the filling hole is sunk during welding and by applied pressure by a depth into the filling hole which is adjusted to about 0.3 mm+/−0.1 mm. This measure reliably prevents the formation of even the smallest gap in the contact region.

For a control mechanism for different types of expansion valves it is of advantage to seal the filling hole of the metallic wall of the airtight chamber filled with gas by a steel ball spot-welded into the filling hole with a ratio between the inner diameter D of the filling hole and the outer diameter d of the spherical surface of the steel ball being set in a range between 0.6 to 0.85. Said ration assures a high sealing reliability without the need of additional or supplemental sealing e-g- by soldering.

If the ratio D/d is smaller than 0.6, this leads to the effect that the steel ball is positioned as if it would be placed on a flat object, and the edge of the filling hole is pushed downward, as shown in FIG. 6, such that the nugget formed by welding fails to be formed around the contact area between the steel ball and the filling hole edge, making it difficult to uniformly seal the filling hole. If D/d was larger than 0.85, this could lead to the effect that the edge of the filling hole is pushed out upwards as shown in FIG. 8, such that the nugget fails to form around the pressure-applied region.

BRIEF DESCRIPTION OF THE DRAWINGS

Embodiments of the invention are described with the help of the drawings. In the drawings is:

FIGS. 2 to 5 Cross-sectional views of differing arrangements between a steel ball and a filling hole, respectively, FIGS. 6 to 8 Respective cross-sectional views illustrating the states of contact in the embodiments of FIGS. 2 to 4, respectively, FIG. 9 A cross-sectional view showing a weld between a steel ball and a filling hole for sealing said filling hole, as well as a part of the weld in enlarged scale, FIG. 10 A cross-sectional view of a state where the steel ball is disposed in contact with the outer edge of the filling hole prior to welding, FIG. 11 A cross-sectional view of a state where the steel ball is spot-welded into the filling hole, FIG. 12 A cross-sectional view and parts of the sealing in enlarged scale of a conventional expansion valve (prior art), FIG. 13 A longitudinal sectional view of a temperature-sensing gas filling jig, and FIG. 14 A chart showing diameter relationships between filling holes and steel balls.

DESCRIPTION OF THE PREFERRED EMBODIMENTS

Figure 1:
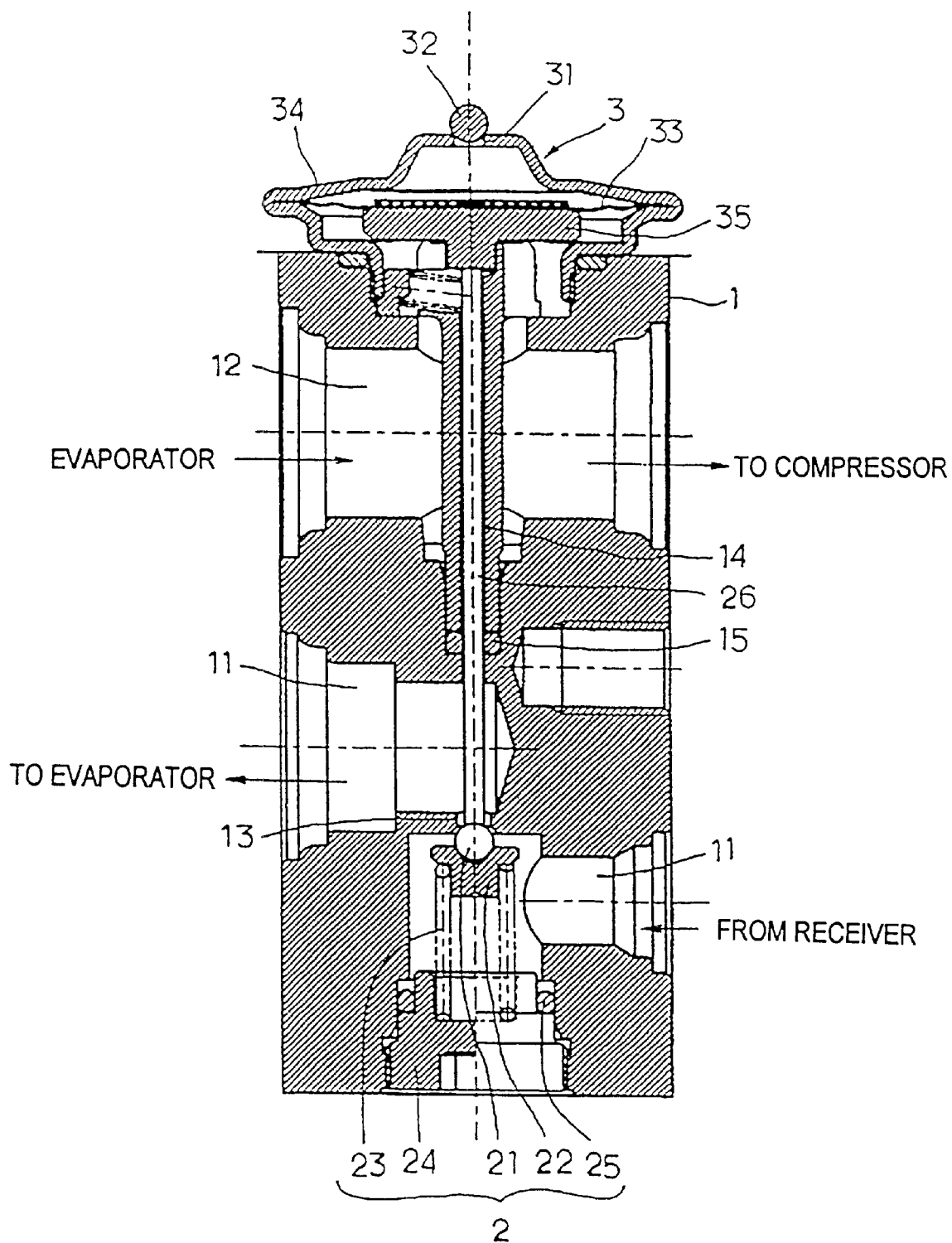
FIG. 1 A longitudinal section of an embodiment of an expansion valve.

An embodiment of an expansion valve illustrated in FIG. 1 comprises a valve body 1, a valve mechanism (throttling valve) 2 arranged within said valve body 1, and an airtight chamber 3 (control mechanism) provided within an upper portion of valve body 1. Valve body 1 has a high-pressure refrigerant passage 11 for supplying a high-pressure refrigerant to an evaporator (not shown). A restricted hole 13 is formed in an immediate portion of passage 11. A low-pressure refrigerant passage 12 for passing a low-pressure refrigerant discharged from the evaporator also is provided in valve body 1. Valve mechanism 2 comprises a ball-shaped valve element 21 for varying the degree of the opening of the restricted hole 13. Further components are: a valve element retainer 22 for supporting valve element 21, a compressed coil spring 23 applying an upward pushing force to valve element 21 via valve element retainer 22, an adjusting nut 24 for adjusting the spring pressure of spring 23, a sealing member 25 like an O-ring for sealing between adjusting nuts 24 and valve body 1, and an actuating rod 26 coupled to valve element 21.

In case of a change of the temperature of the low-pressure refrigerant in passage 12 and the consequent change of the internal pressure in the airtight chamber 3, valve mechanism 2 adjusts the flow rate of the high-pressure refrigerant in the high-pressure refrigerant passage 11 by accordingly adjusting the degree of opening of the high-pressure refrigerant passage 11 connected to an inlet port of the not shown evaporator.

The airtight chamber 3 is filled with a temperature-sensing gas which changes in volume (expands or contracts) in accordance with the temperature of the low-pressure refrigerant.

Said airtight chamber 3 is sealingly closed by a steel ball 32 defining a metal plug securely fixed by resistance welding such as projection welding or spot welding in a circular filling hole 31, as soon as the temperature-sensing gas has been filled in. Welded steel ball 32 seals filling hole 31. A boundary of said airtight chamber is constituted by a diaphragm 33, e.g. a flexible thin film, which is displaceable in a vertical direction. A metal wall 34, e.g. made of stainless steel, surrounds diaphragm 33. A diaphragm support 35 protects the lower surface of diaphragm 33.

A space defined beneath the lower surface of diaphragm 33 communicates with passage 12. The pressure in said space is equal to the pressure of the low-pressure refrigerant. Consequently, if the internal pressure within airtight chamber 3 is changing, diaphragm 33 in FIG. 1 is displaced in accordance with the differential pressure between the internal pressure within airtight chamber 3 and the pressure of the low-pressure refrigerant.

An actuating rod 26 for valve element 21 passes a receiving hole 14 in valve body 1 and abuts against diaphragm support 35. An O-ring 15 is provided for sealing purposes. In synchronization with displacements of diaphragm 33 valve element 21 is actuated via actuating rod 26. As valve element 21 is displaced, the opening area of restricted hole 13 varies, whereby the quantity of high-pressure refrigerant supplied to the evaporator via passage 11 is controlled.

Steel ball 32 has a spherical surface with an outer diameter d. The inner diameter of the filling hole 31 prior to welding is D. Steel ball 32 can be joined with high sealing reliability into filling hole 31 by resistance welding, if the diameter ratio D/d falls within a range from 0.6 to 0.85.

In addition to ratio D/d set to fall within said range of 0.6 to 0.85, an angle Q, Q1 to Q4, between a line passing through the center of the steel ball 32 and the center of the circular filling hole 31 and a straight line passing through the center of the steel ball and a point at which the spherical surface of the steel ball touches the edge of the filling hole 31 is set within a range between about 37° to about 58° (FIGS. 2 to 5).

FIGS. 2 to 5 illustrate cases where the steel ball 32 had a diameter d of 3.175 mm and was joined by a resistance welding into the filling hole 31 the inner diameter of which was varied within a given range.

In FIG. 2 filling hole 31 had an inner diameter D1 of 1.9 mm. The angle Q1 was about 37°. The ratio D/d was approximately 0.60.

Figure 7:
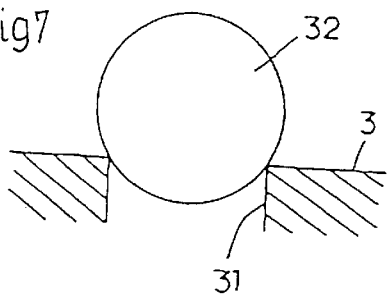

In FIG. 3 filling hole 31 had an inner diameter D2 of 2.5 mm. The angle Q2 was about 45°. Ratio D/d was approximately 0.705. In the illustrated case steel ball 32 was joined by resistance welding such that the inner edge of the filling hole 33 was not substantially deformed, e.g. as shown in FIG. 7.

Figure 4:
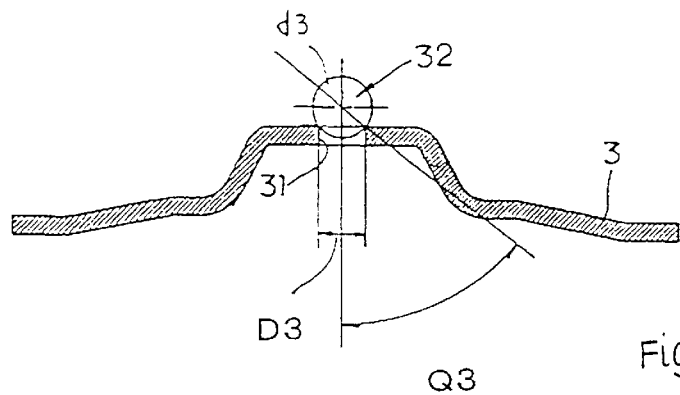

In FIG. 4 filling hole 31 had an inner diameter D3 of 2.5 mm. The angle Q3 was about 52°. Ratio D/d was approximately 0.79.

Figure 5:
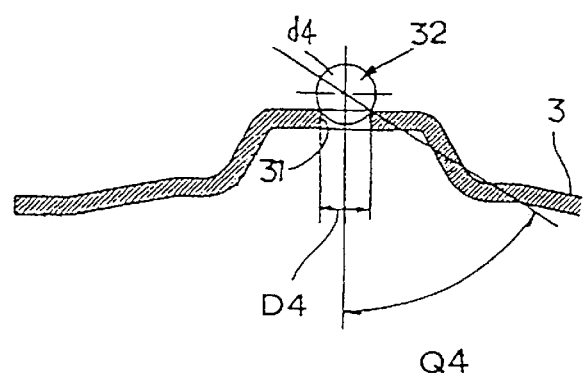

In FIG. 5 filling hole 31 had an inner diameter D4 of 2.7 mm. The angle Q4 was about 58°. Ratio D/d was approximately 0.85.

Figure 8:
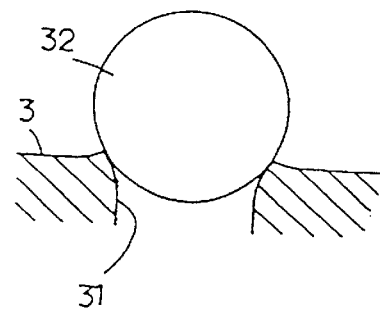
Figure 6:
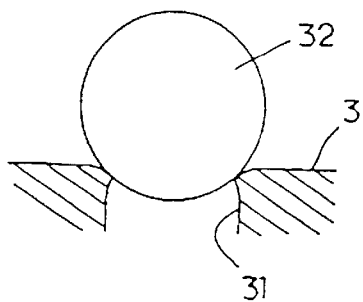

In the case of FIG. 2 the edge of the filling hole 31 was deformed inward and downward, as shown in FIG. 6. In the case of FIG. 5, resistance welding was performed such that the edge of the filling hole 31 was somewhat deformed outward and upward as shown in FIG. 8. In either case, no poor weld was caused.

Figure 9:
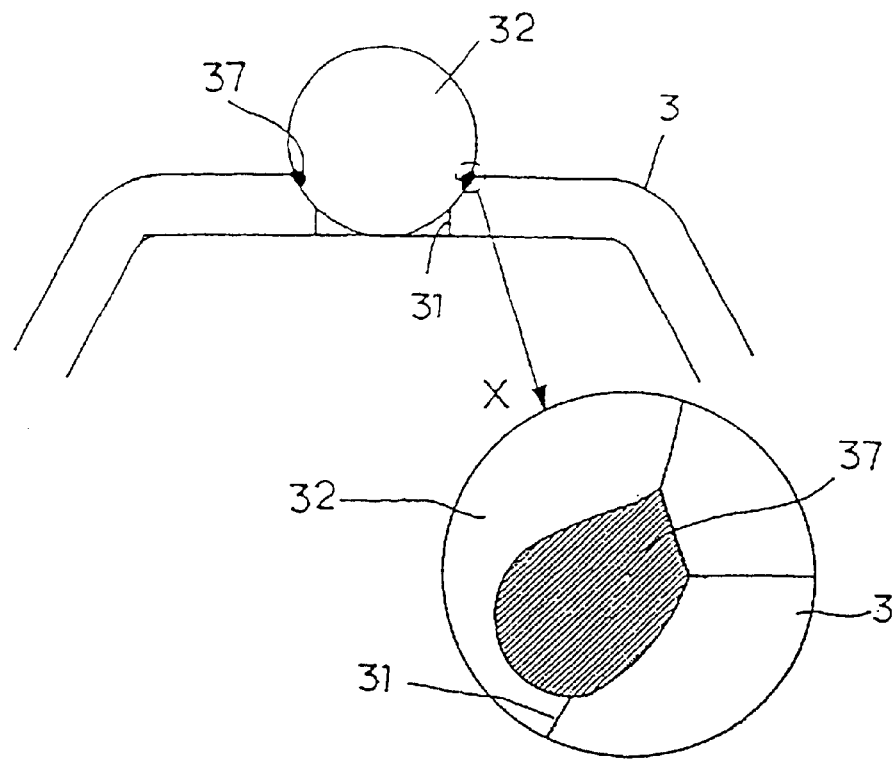

Further, as shown in FIG. 9, a satisfactory weld (nugget) 37 could be formed around the contact portion between the steel ball 32 and filling hole 31 over the entire peripheral edge of the filling hole 31 and yet uniformly on the same circumference. Namely, since the weld includes no pressure-applied region situated between the filling hole 31 and steel ball 32, the steel ball 32 can be securely fitted with reliability. In addition, at the contact portion between steel ball 32 and filling hole 31, a gap 39 is not formed inside of the weld or nugget 37 but outside of the same, whereby crevice corrosion can be prevented and the sealing performance of steel ball 32 can be enhanced.

FIG. 13 shows a state in which an airtight chamber unit 40 is set in a temperature-sensing gas filling jig 50. Airtight chamber unit 40 including diaphragm 33 and airtight chamber 3 is clamped in position between lower and upper blocks 41 and 42 such that filling hole 31 is oriented downwardly. Lower block 41 has a through hole 44 with a somewhat larger diameter than filling hole 31. A plunger 45 is axially movably received in hole 44.

Steel ball 32 is positioned on the upper end of plunger 45 in alignment with filling hole 31. Plunger 45 can be moved up and down by a motor (not shown). An injection pipe 48 serves to introduce the temperature-sensing gas from outside and is connected to a space 47 in the center portion of jig 50, in which center portion the filling hole 31 is located. Said space 47 is sealed by seal rings 43 and 46.

When filling the airtight chamber 3 with temperature-sensing gas in jig 50 first the air out of space 47 is drawn to the outside through injection pipe 48. Then temperature-sensing gas is filled into the airtight chamber 3. Thereafter plunger 45 is moved up until steel ball 32 comes into contact with the edge of filling hole 31. Then, a spot welding voltage high enough to instantaneously produce a large quantity of heat, as e.g. by inverter-controlled resistance welding is applied between upper block 42 and plunger 45. As a consequence, in the contact portion with a small contact area between steel ball 32 and filling hole 31 cut into the outer metallic wall of airtight chamber 3 a sealing spot weld is instantaneously formed.

Figure 10:
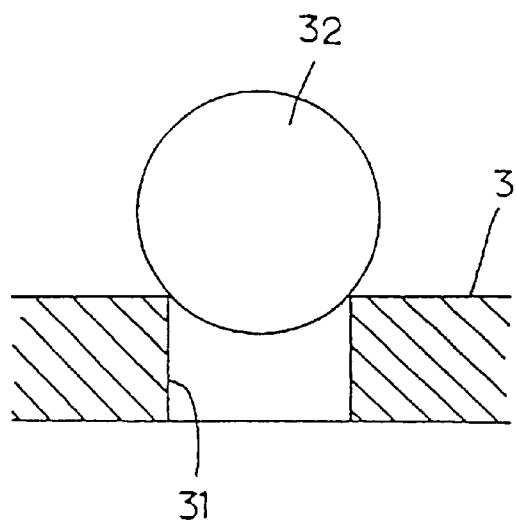
Figure 11:
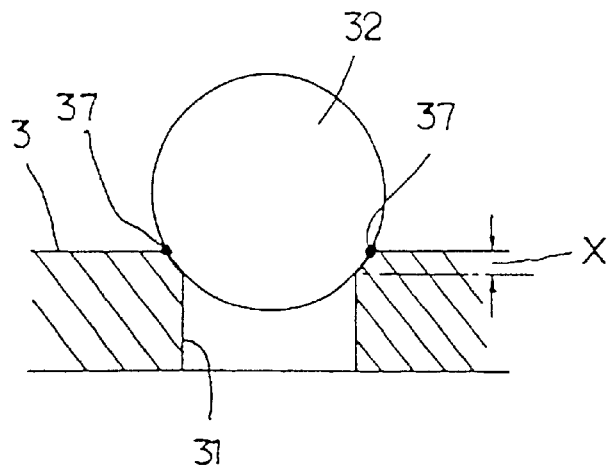
Figure 12:
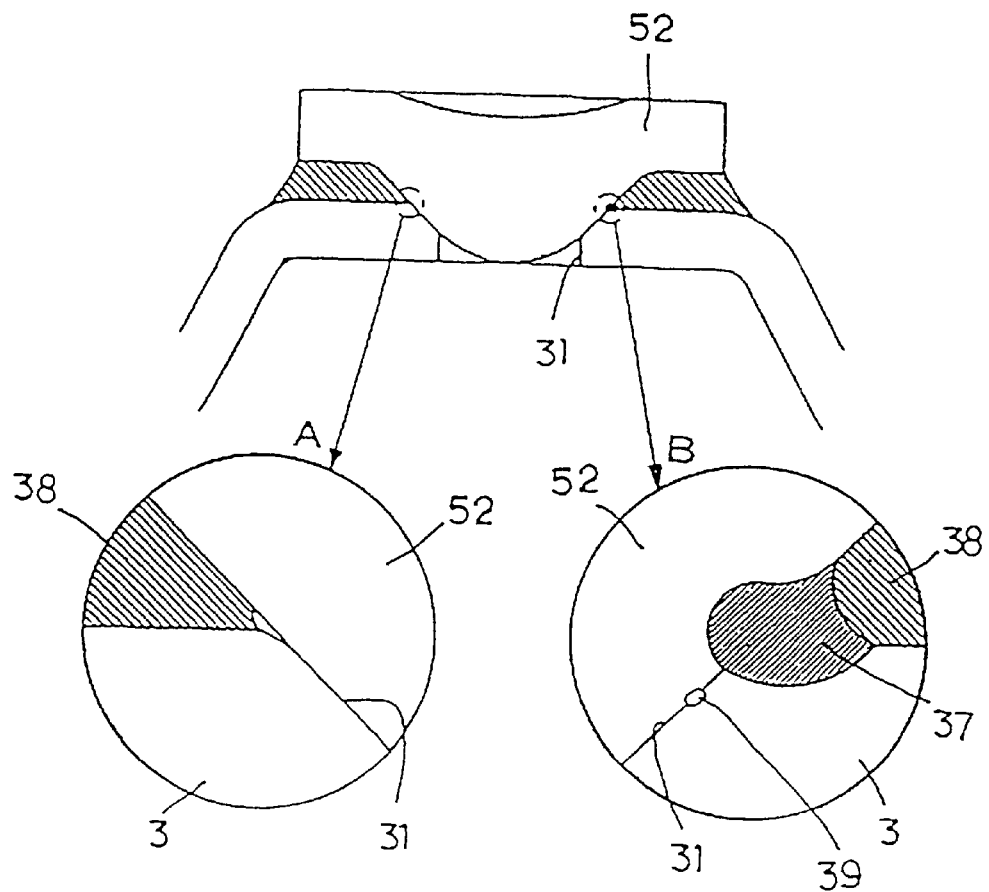

As shown in FIGS. 10 and 11 spot welding or projection welding is performed with steel ball 32 disposed in contact with filling hole 31. In this case, resistance welding is effected such that steel ball 32 sinks by a depth X into the inner peripheral surface of the filling hole 31. Said depth X is adjusted to fall into a range of about 0.3 mm+/−0.1 mm. In this case, the nugget 37 is formed on the same circumference around the contact portion between the edge of filling hole 31 and steel ball 32, as shown in FIG. 11. By slightly pressing steel ball 32 into filling hole 31 the sealing accuracy can be enhanced.

FIG. 14 shows measurement data for setting the ratio D/d, i.e. the ratio between the inner diameter D of filling hole 31 and the outer diameter d of the spherical surface of steel ball 32. Said ratio ought to be set to a value falling into a range of 0.6 to 0.85. The table shows measurement data relating to the filling hole or orifice diameter and the steel ball or ball diameter for respective different diameter magnitudes. Said data was obtained with steel balls having different diameters of 2.5 m, 3.175 mm, 3.5 mm, 3.97 mm and 4.5 mm, by way of example and not just using a steel ball of one fixed diameter only.

What is claimed is:

1. An expansion valve including a valve body having a high-pressure refrigerant passage for supplying a high-pressure refrigerant to an evaporator of a refrigeration system, and a low-pressure refrigerant passage for a low-pressure refrigerant discharged from said evaporator, a valve mechanism for regulating a flow rate of the high-pressure refrigerant in the high-pressure refrigerant passage, and a control mechanism having an airtight chamber filled with a temperature-sensing gas, a circular filling hole for filling the temperature-sensing gas into the airtight chamber, and a steel ball fixed by spot welding in said filling hole for sealing the filled airtight chamber, the control mechanism controlling the valve mechanism in accordance with a change in pressure in the airtight chamber caused by a change in volume of the temperature-sensing gas which is induced by a change in temperature of the low-pressure refrigerant flowing through said low-pressure refrigerant passage, wherein the spherical surface of said steel ball has a diameter d and said filling hole has an inner diameter D and wherein D/d is set to fall within a range from 0.6 to 0.85.

2. Expansion valve as in claim 1, wherein said steel ball is spot-welded to said filling hole such that a depth by which the steel ball first resting on the circular upper filling hole edge sinks into the filling hole while being spot-welded is adjusted to 0.3 mm+/−0.1 mm.

3. Expansion valve as in claim 1, wherein said steel ball is spot-welded into said filling hole such that an angle between a line passing through the center of said steel ball and the center of said filling hole and a straight line passing through the center of the steel ball and a point at which the spherical surface of the steel ball touches an upper edge of the filling hole is set to 37° to 58°, and wherein the diameter of the steel ball is set within a range between approximately 2.5 mm and 4.5 mm.

4. An expansion valve comprising:

a valve body having a high-pressure refrigerant passage configured to supply a high-pressure refrigerant to an evaporator of a refrigeration system;

a low-pressure refrigerant passage configured to pass a low-pressure refrigerant discharged from said evaporator;

a valve mechanism configured to regulate a flow rate of the high-pressure refrigerant in the high-pressure refrigerant passage; and a control mechanism having an airtight chamber filled with a temperature-sensing gas, a circular filling hole for filling the temperature-sensing gas into the airtight chamber, and a steel ball fixed by spot welding in said filling hole for sealing the filled airtight chamber, the control mechanism configured to control the valve mechanism in accordance with a change in pressure in the airtight chamber caused by a change in volume of the temperature-sensing gas which is induced by a change in temperature of the low-pressure refrigerant flowing through said low-pressure refrigerant passage, wherein the spherical surface of said steel ball has an outer diameter d and said filling hole has an inner diameter D and wherein the ratio of D/d is set to fall within a range from approximately 0.6 to 0.85.

5. The expansion valve according to claim 4, wherein said steel ball is spot-welded into said filling hole such that an angle between a line passing through the center of said steel ball and the center of said filling hole and a straight line passing through the center of the steel ball and a point at which the spherical surface of the steel ball touches an upper edge of the filling hole is set to 37° to 58°.

6. The expansion valve according to claim 4, wherein said steel ball is spot-welded to said filling hole such that a depth by which the steel ball first resting on the circular upper filling hole edge sinks into the filling hole while being spot-welded is adjusted to 0.3 mm+/−1.0 mm.

7. The expansion valve according to claim 4, wherein said steel ball is spot-welded into said filling hole such that an angle between a line passing through the center of said steel ball and the center of said filling hole and a straight line passing through the center of the steel ball and a point at which the spherical surface of the steel ball touches an upper edge of the filling hole is set to 37/° to 58/°, and wherein the diameter of the steel ball is set within a range between approximately 2.5 mm and 4.5 mm.

* * * * *